(No Model.)
A. GUMZ.
CUTTING APPARATUS FOR REAPERS AND MOWERS.
No. 391,142. Patented Oct. 16, 1888.
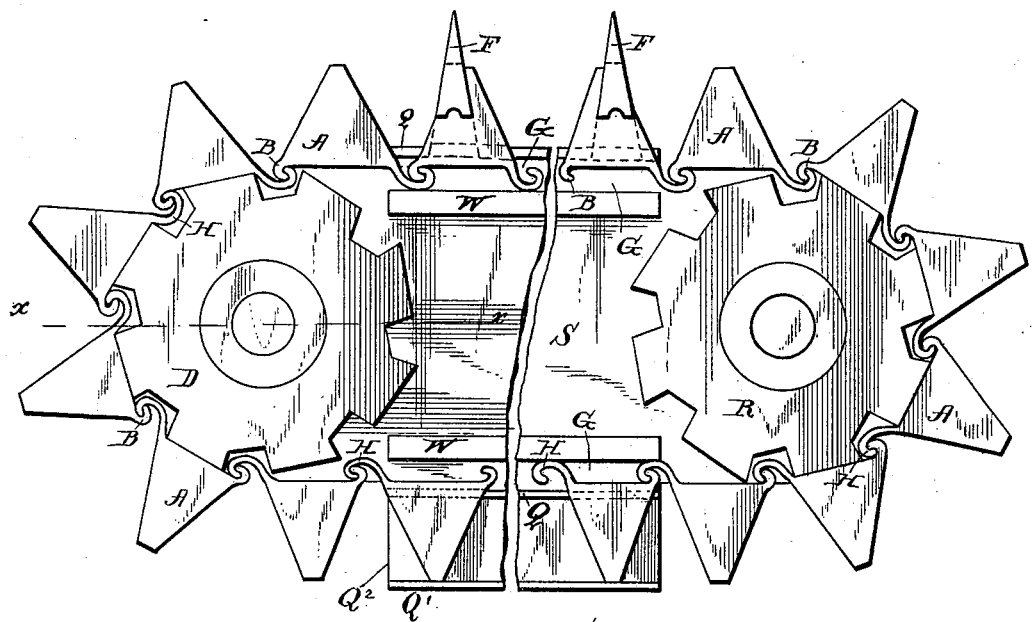
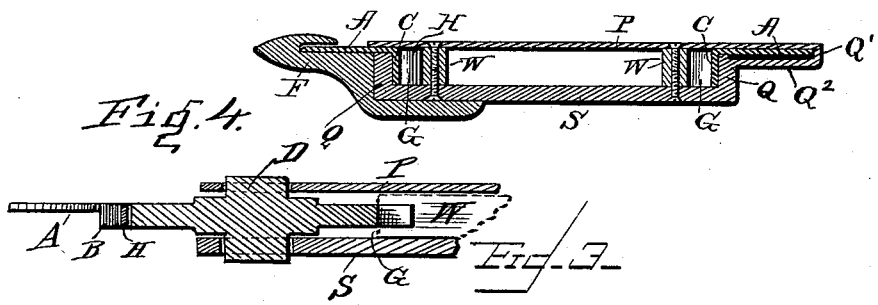
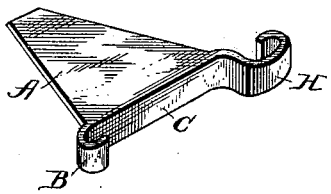
WITNESSES.
B. Fugitt.
P. C. Masi.
INVENTOR.
Albert Gumz.
By Anderson & Smith
ATTORNEYS.

UNITED STATES PATENT OFFICE.

ALBERT GUMZ, OF FORT HOWARD, WISCONSIN.

CUTTING APPARATUS FOR REAPERS AND MOWERS.

SPECIFICATION forming part of Letters Patent No. 391,142, dated October 16, 1888.

Application filed November 16, 1886. Renewed February 11, 1888. Serial No. 263,712. (No model.)

*To all whom it may concern:*

Be it known that I, ALBERT GUMZ, a citizen of the United States, and a resident of Fort Howard, in the county of Brown and State of Wisconsin, have invented certain new and useful Improvements in Reaper and Mower Sickles; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a plan view with the cap-plate removed. Fig. 2 is a transverse section of the sickle bar and guards. Fig. 3 is a perspective view of the knife or link. Fig. 4 is a longitudinal vertical section of the finger-bar, the outline of the rib W being indicated by dotted lines.

The invention relates to reaper and mower sickles; and it consists in the construction and novel combination of parts, as hereinafter described and claimed.

The object of the invention is to so construct and arrange the knives that form the sickle that when the machine is drawn or moved forward the sickle will cut or shear the grain or grass as it comes in contact therewith without producing the vibrating or shaking motion heretofore met with in this class of machines.

Referring by letter to the accompanying drawings, S designates the finger-bar, which is provided with ribs W and upturned edges Q, which form parallel grooves or channels for the endless chain of knives A. Each knife A is provided along its base with a vertical flange, C, said flange C being provided on its ends with oppositely-turned hooks B H, which adapt the knives to be connected to form the endless chain of knives or sickles.

D and R designate sprocket-wheels which are journaled upon vertical shafts at the ends of the sickle-bar, the hooks B H entering the spaces between the teeth of the sprocket-wheels.

F designates the finger-guards, which are of the usual construction.

P is the cap-plate, by which the sickle is retained in place and prevented from leaving its track.

When necessary, any one of the knives can be easily detached for the purpose of sharpening it, or should a knife become broken it can be quickly replaced by a new knife without necessitating a trip to the workshop.

It will be observed that the upturned edges Q of the finger-bar and the ribs W, which form the grooves, terminate near the sprocket-wheels D R, and afford substantial guides for the endless chain of knives. It will also be observed that the knives are hooked together without the intervention of links.

It will be observed by reference to Figs. 1 and 2 that at the rear of the finger-bar I show beside the rib W two flanges, Q Q', the latter serving as a guard for the points of the knives, and that at the front of the finger-bar the flange Q' is omitted and fingers F employed. The upturned edges Q Q' and the ribs W W extend nearly the entire length of the straight portions of the finger-bar.

It will be observed by reference to Figs. 1 and 2 that at the rear end of the cutting apparatus, in addition to the rib W and upturned flange Q, I form on a horizontal extension, $Q^2$, of the finger-bar an upturned flange, Q', which serves as a guard for the points of the cutters. It will also be observed that the cutters are all provided with flanges C, which have peculiar hooked extensions B H, above referred to, which form interhooking couplings, and also braces for the cutters while passing through the grooves formed between the portions W Q, and which also engage with notches in the wheels D R.

Having described this invention, what I claim, and desire to secure by Letters Patent, is—

The within-described cutting apparatus for reaping and mowing machines, consisting of the following elements: a finger-bar provided at each end with a sprocket-wheel, at its front edge with parallel ribs W and upturned flange Q, forming a guideway for the cutters, and at its rear edge with corresponding rib and flange W Q, also forming a guideway for the cutters, the rear horizontal extension, $Q^2$, and the upturned guard-flange Q' for the points of said cutters, combined with an endless chain of cutters having flanges C and interlocking coupling-hooks, and a cap-plate, P, all substantially as described.

In testimony whereof I affix my signature in presence of two witnesses.

ALBERT GUMZ.

Witnesses:
CHAS. S. KERR,
JAMES KERR.